(No Model.) 2 Sheets—Sheet 1.
A. E. COLGATE.
GALVANOMETER.
No. 429,887. Patented June 10, 1890.
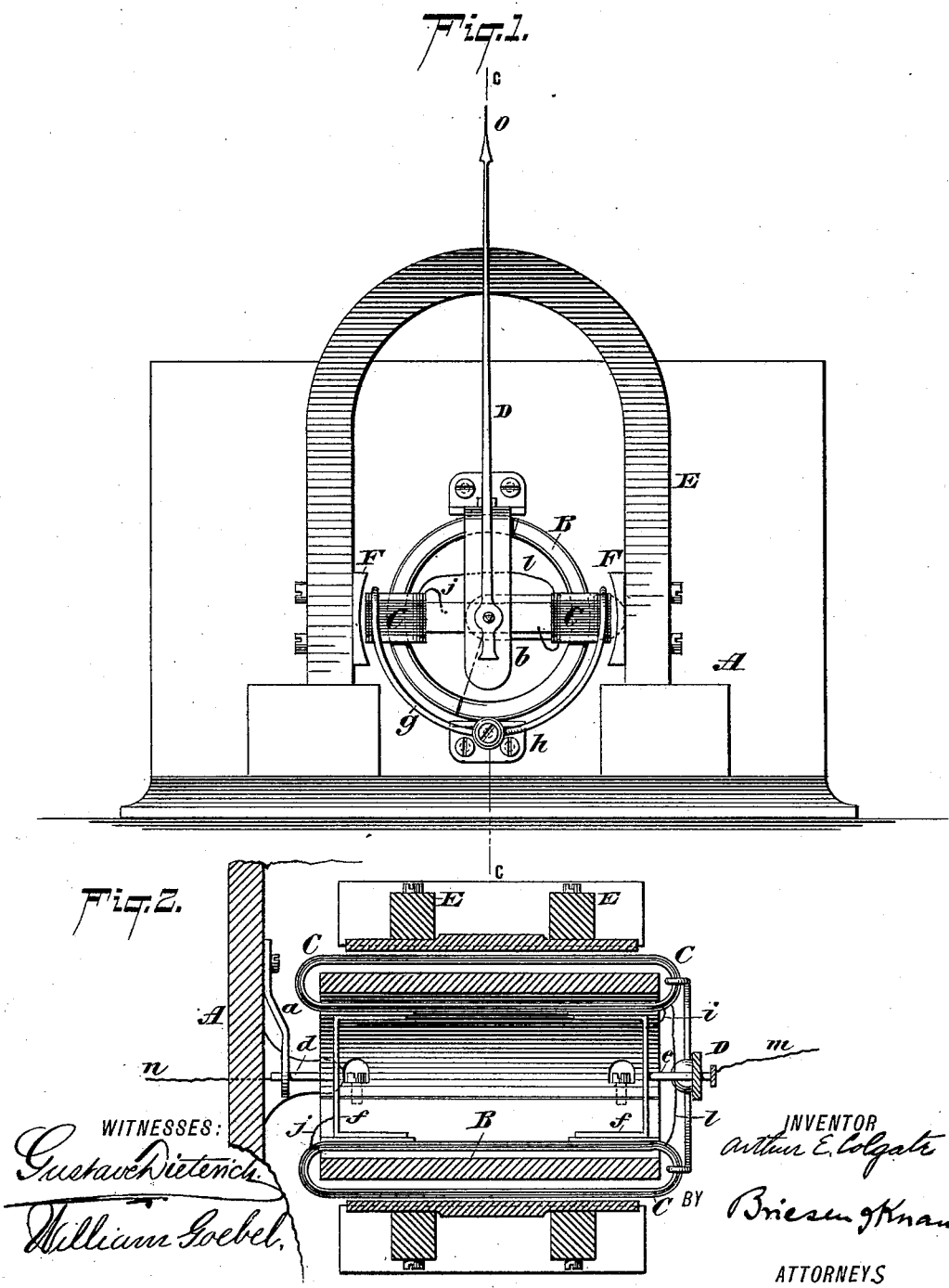
WITNESSES:
Gustav Dieterich
William Goebel
INVENTOR
Arthur E. Colgate
BY
Briesen & Knauth
ATTORNEYS

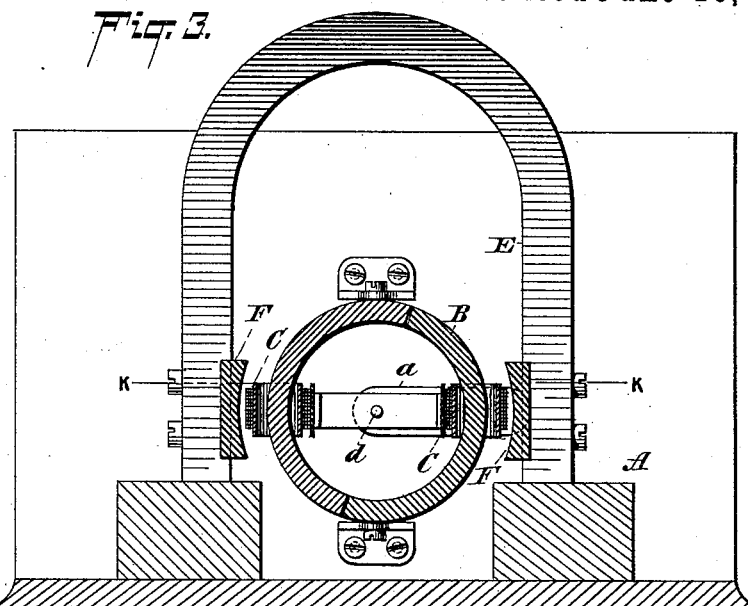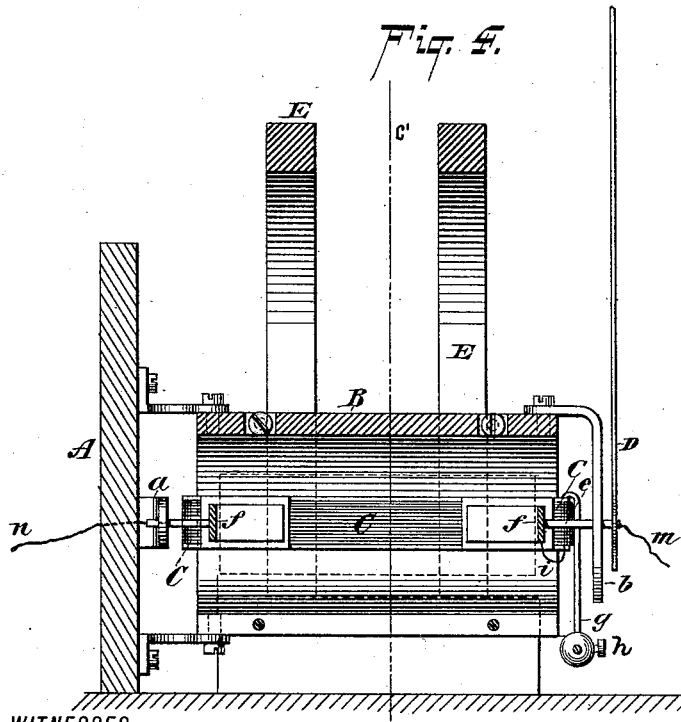

UNITED STATES PATENT OFFICE.

ARTHUR E. COLGATE, OF NEW YORK, N. Y., ASSIGNOR TO F. G. OTTO & SONS, OF SAME PLACE.

GALVANOMETER.

SPECIFICATION forming part of Letters Patent No. 429,887, dated June 10, 1890.

Application filed March 14, 1890. Serial No. 343,825. (No model.)

*To all whom it may concern:*

Be it known that I, ARTHUR E. COLGATE, a resident of the city of New York, in the county and State of New York, have invented an Improved Galvanometer, of which the following is a specification, reference being had to the accompanying drawings, forming a part hereof, wherein—

Figure 1 is a front elevation of my improved galvanometer. Fig. 2 is a horizontal central section of the same on the line $k\,k$, Fig. 3. Fig. 3 is a vertical cross-section of the same on the line $c'\,c'$, Fig. 4; and Fig. 4 is a vertical longitudinal section on the line $c\,c$, Fig. 1.

This invention relates to a new instrument for measuring the strength of a battery-current passing through a human or other body; and it consists, mainly, in combining with an inner cylindrical stationary core and with an outer magnet or set of magnets straddling said core an intermediate movable coil or set of coils, which is connected with the pointer or index-finger of the instrument, as hereinafter more fully described.

In the accompanying drawings, the letter A represents the stationary framing or support of my new galvanometer. To the same is rigidly secured a horizontal cylinder B, made of soft iron or steel, preferably constructed in two pieces to facilitate the putting on of the hollow coils. The frame A also carries the inner bearing $a$, while the outer end of the cylinder B carries the outer bearing $b$ of the knife-edge or other pivots or torsion-bearings $d\,e$ of the movable coils C. These two coils C C embrace each the wall of the cylinder B, and the coils are connected together by insulated braces $f$, so as to be a united structure vibrating on the pivots $d\,e$. The outer pivot $e$ also carries the upwardly-projecting pointer D. For the purpose of balancing the coils C C they are united by a wire or hanger $g$ to a counter-weight $h$, which serves to hold the coils C C normally on the same horizontal plane and the pointer D normally vertical.

E E are magnets supported on the frame A, so as to straddle the cylinder B. There may be any number of these magnets, two being shown in Fig. 2. The legs of the magnets are connected by soft-iron pole-pieces F F, which are opposite the coils C C, as shown. The coils C C are connected either in series or in multiple. The wires of the coils terminate in the bearings $d\,e$. This is shown in Fig. 2, where one terminal $i$ of one coil C goes to the insulated outer brace $f$, and thence to the pivot $e$, while the terminal of the other coil C is shown at $j$ going to the inner brace $f$ and thence to the pivot $d$, the wire $l$, Fig. 1, uniting the two coils. The battery-wires $m\,n$ also go to the pivots $d\,e$, as shown.

When a battery-current is allowed to pass through the instrument and through the person of a patient, the galvanometer here described being in circuit will indicate by the deflection of the needle D the strength of the current that passes through the patient, for the current going through the coils C C will, by disturbing the magnetic field, cause a corresponding disturbance in the position of the vibrating coils and their pointer.

I have shown two coils C C and two pole-pieces F F; but the invention will be found if there be but one of these coils used properly balanced in combination with one of these pole-pieces.

Having now described my invention, what I claim is—

1. In a galvanometer, the stationary cylinder B, and stationary magnet E, having pole-piece F, combined with the pivoted and balanced hollow coil C, which embraces the wall of the cylinder B, substantially as described.

2. In a galvanometer, the stationary cylinder B, combined with the magnet E E, having pole-pieces F F, and with the pivoted hollow coils C C, united to the counter-weight $h$ and placed around the cylinder, substantially as and for the purpose described.

3. In a galvanometer, the stationary cylinder B, combined with the magnet E E, having pole-pieces F F, with the pivoted hollow coils C C, united to the counter-weight $h$ and embracing the cylinder, and with the pointer D, mounted upon one of the pivots of said coils, substantially as herein shown and described.

4. In a galvanometer, the stationary cylinder B, combined with the coils C C, embracing its walls, and with the insulated connecting-brackets $f$, carrying pivots $d\ e$, fixed supports $a\ b$ for said pivots, counter-weight $h$, pointer D, and magnet E, all substantially as and for the purpose herein shown and described.

ARTHUR E. COLGATE.

Witnesses:
HARRY M. TURK,
LIVINGSTON EMERY.